US012706241B2

(12) United States Patent
Zhang et al.

(10) Patent No.: US 12,706,241 B2
(45) Date of Patent: Aug. 11, 2026

(54) TRANSFORMER AND POWER EQUIPMENT WITH LONG-TERM INSULATION RELIABILITY

(71) Applicant: Huawei Digital Power Technologies Co., Ltd., Shenzhen (CN)

(72) Inventors: Zelong Zhang, Shenzhen (CN); Zhuyong Huang, Dongguan (CN); Xiaoqing Hu, Dongguan (CN); Qunyou Zhang, Shenzhen (CN); Wen Zhao, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 893 days.

(21) Appl. No.: 17/987,239

(22) Filed: Nov. 15, 2022

(65) Prior Publication Data

US 2023/0154672 A1 May 18, 2023

(30) Foreign Application Priority Data

Nov. 16, 2021 (CN) ......................... 202111351633.3

(51) Int. Cl.
*H01F 27/32* (2006.01)
*H01F 27/24* (2006.01)

(52) U.S. Cl.
CPC ............. *H01F 27/32* (2013.01); *H01F 27/24* (2013.01)

(58) Field of Classification Search
CPC ........ H01F 27/32; H01F 27/24; H01F 27/324; H01F 27/2885; H01F 27/306;
(Continued)

(56) References Cited

U.S. PATENT DOCUMENTS 3,380,009 A * 4/1968 Miller ..................... H01F 38/30
336/84 R
4,009,306 A 2/1977 Yamashita et al.
(Continued)

FOREIGN PATENT DOCUMENTS

CN 101529536 A 9/2009
CN 201616342 U 10/2010
(Continued)

*Primary Examiner* — Mang Tin Bik Lian
(74) *Attorney, Agent, or Firm* — WOMBLE BOND DICKINSON (US) LLP

(57) ABSTRACT

This application relates to a transformer and power equipment. The transformer includes: a low-voltage coil; a high-voltage coil; a magnetic core, where at least a part of the magnetic core is penetrated through the low-voltage coil and the high-voltage coil; an insulation member with a ground plane disposed on an outer surface of the insulation member; and a voltage uniform layer. The insulation member is wrapped around the high-voltage coil, so that the high-voltage coil is insulated from the low-voltage coil and the magnetic core, heat dissipation of the high-voltage coil, low-voltage coil and the magnetic core can be facilitated, and a service life of the transformer can be prolonged. A structure of the transformer is simplified, so that installation and maintenance of the low-voltage coil and the magnetic core can be facilitated, and processing and maintenance costs of the transformer can be reduced.

19 Claims, 3 Drawing Sheets

(58) Field of Classification Search
CPC ...... H01F 27/266; H01F 27/28; H01F 27/323; H01F 27/289; H01F 27/38; H01F 27/245
See application file for complete search history.

(56) References Cited

U.S. PATENT DOCUMENTS

| | | | | |
|---|---|---|---|---|
| 4,176,334 | A * | 11/1979 | Buritz | H01F 27/363 29/606 |
| 4,214,119 | A * | 7/1980 | Keen, Jr. | H01B 17/30 277/606 |
| 4,320,372 | A * | 3/1982 | Thuries | H01F 38/30 336/174 |
| 4,459,575 | A * | 7/1984 | Geissler | H01F 27/36 336/196 |
| 4,540,967 | A | 9/1985 | Chitose | |
| 2012/0092115 | A1* | 4/2012 | Srinivasrao | H01F 27/02 336/170 |
| 2018/0053597 | A1* | 2/2018 | Kainaga | H01F 27/363 |
| 2020/0251278 | A1* | 8/2020 | Zhang | H01F 38/42 |

FOREIGN PATENT DOCUMENTS

| | | | |
|---|---|---|---|
| CN | 102064011 | A | 5/2011 |
| CN | 102971811 | A | 3/2013 |
| CN | 103117156 | A | 5/2013 |
| CN | 104867666 | A | 8/2015 |
| CN | 206460860 | U | 9/2017 |
| CN | 110323050 | A | 10/2019 |
| CN | 209804426 | U | 12/2019 |
| CN | 110853898 | A | 2/2020 |
| CN | 111599577 | A | 8/2020 |
| CN | 111599580 | A | 8/2020 |
| EP | 3144944 | A1 | 3/2017 |

* cited by examiner

TRANSFORMER AND POWER EQUIPMENT WITH LONG-TERM INSULATION RELIABILITY

CROSS-REFERENCE TO RELATED APPLICATIONS

This application claims priority to Chinese Patent Application No. 202111351633.3, filed on Nov. 16, 2021, which is hereby incorporated by reference in its entirety.

TECHNICAL FIELD

This application relates to the field of power equipment technologies, and in particular, to a transformer and power equipment.

BACKGROUND

There is an electric difference between a high-voltage component (such as a high-voltage coil), a low-voltage component (such as a low-voltage coil), and a magnetic core that are disposed inside a transformer. Therefore, different electric field strength exists at different insulation positions. When partial field strength is too high, a relatively large partial discharge is caused. Therefore, insulation reliability is affected, and finally device insulation fails during long-term operation. To meet an insulation requirement between the high-voltage component, the low-voltage component, and the magnetic core, a solid insulation material is usually filled between and outside the high-voltage coil and the low-voltage coil in a solid insulation manner. Because the insulation material is wrapped around the high-voltage coil and the low-voltage coil, it is difficult for the high-voltage coil and the low-voltage coil to dissipate heat, affecting lives of the high-voltage coil and the low-voltage coil.

SUMMARY

This application provides a transformer and power equipment. The transformer can effectively improve insulation reliability and reduce a partial discharge amount of the transformer, to facilitate heat dissipation of a high-voltage coil, a low-voltage coil, and a magnetic core while meeting insulation requirements of the high-voltage coil and the low-voltage coil, thereby prolonging service lives of the high-voltage coil and the low-voltage coil.

A first aspect of this application provides a transformer. The transformer includes:

- a low-voltage coil;
- a high-voltage coil;
- a magnetic core, where at least a part of the magnetic core is penetrated through the low-voltage coil and the high-voltage coil; and
- an insulation member, where the insulation member is wrapped around the high-voltage coil to insulate the high-voltage coil from the low-voltage coil and the magnetic core, and a ground plane is disposed on at least a part of an outer surface of the insulation member.

A voltage uniform layer is disposed between the high-voltage coil and the insulation member, the voltage uniform layer is wrapped around the high-voltage coil, and the voltage uniform layer is electrically connected to one end of the high-voltage coil.

In this application, the insulation member is wrapped around only the high-voltage coil. Therefore, heat dissipation of the low-voltage coil and the magnetic core can be facilitated while the high-voltage coil is insulated from the low-voltage coil and the magnetic core, to reduce a risk that the low-voltage coil and the magnetic core are damaged due to poor heat dissipation of the low-voltage coil and the magnetic core, thereby prolonging a service life of the transformer. In addition, installation and maintenance of the low-voltage coil and the magnetic core can be facilitated, thereby reducing processing and maintenance costs of the transformer. The voltage uniform layer and the ground plane are used, so that a problem that partial field strength between a high voltage and a low voltage of the transformer is excessively high can be effectively resolved, to reduce a partial discharge, thereby improving long-term insulation reliability.

In one embodiment, the insulation member is wrapped around the high-voltage coil through casting.

In this application, the insulation member is wrapped around the high-voltage coil through casting, so that a connection manner between the insulation member and the high-voltage coil can be simplified, thereby reducing production costs of the high-voltage coil and the insulation member. In addition, connection stability between the high-voltage coil and the insulation member can be improved, to reduce a risk that the high-voltage coil moves relative to the insulator, thereby improving working stability and use safety of the transformer.

In one embodiment, the high-voltage coil includes a coil body, a cable outlet portion, and a connection terminal. One end of the cable outlet portion is connected to the coil body, and the other end is connected to the connection terminal. The insulation member is wrapped around the coil body and the cable outlet portion, and at least a part of the connection terminal is exposed by being penetrated through the insulation member.

In this application, a creepage distance M1 exists between an end that is of the ground plane and that is close to the connection terminal and the connection terminal, and an electrical clearance H1 exists between the end that is of the ground plane and that is close to the connection terminal and the connection terminal. The insulation member is wrapped around the coil body and the cable outlet portion and wrapped around a part of the connection terminal, so that the creepage distance M1 and the electrical clearance H1 can be increased, to reduce a risk that air on the periphery of the insulation member is broken down by a strong electric field, thereby further improving use safety of the transformer.

In one embodiment, a creepage distance M2 exists between an end that is of the low-voltage coil and that is close to the connection terminal and the connection terminal, an electrical clearance H2 exists between the end that is of the low-voltage coil and that is close to the connection terminal and the connection terminal, M2>M1, and H2>H1.

A creepage distance M3 exists between an end that is of the magnetic core and that is close to the connection terminal and the connection terminal, an electrical clearance H3 exists between the end that is of the magnetic core and that is close to the connection terminal and the connection terminal, M3>M1, and H3>H1.

In this application, M2>M1, and M3>M1, so that a length of the ground plane is greater than a length of the low-voltage coil and a length of the magnetic core. Therefore, a risk that the air is broken down by a strong electric field can be reduced, thereby improving use safety of the transformer and extending a service life of the transformer. H2>H1, and H3>H1, that is, in a thickness direction of the high-voltage coil, a distance between the low-voltage coil and the connection terminal is less than a distance between the ground plane and the connection terminal, and a distance between the magnetic core and the connection terminal is less than the distance between the ground plane and the connection terminal, so that installation of the high-voltage coil, the low-voltage coil, and the magnetic core can be facilitated, to simplify a structure of the transformer, thereby reducing production costs of the transformer.

In one embodiment, the insulation member includes a body portion and an extension portion, the body portion is wrapped around the coil body, and the extension portion is wrapped around the cable outlet portion and the part of the connection terminal. The extension portion has a first end connected to the body portion, and a thickness of the first end is greater than a thickness of the body portion.

In this application, the thickness of the first end of the insulation member is greater than the thickness of the body portion, so that a risk that air outside the first end is broken down by a strong electric field can be reduced, thereby improving use safety of the transformer.

In one embodiment, the body portion is connected to the extension portion by using a transition portion, the transition portion is arc-shaped, and a cross-sectional area of the transition portion increases in a direction from the body portion to the extension portion. The ground plane is wrapped around the transition portion.

In this application, the body portion is connected to the extension portion by using the arc-shaped transition portion, that is, a shape of the transition portion is close to a shape of an electric field line, so that a size of the insulation member is reduced while a risk that the air is broken down by an end electric field is reduced, thereby reducing production costs of the insulation member. The ground plane is wrapped around an outer surface of the transition portion, so that a risk that air outside the transition portion is broken down by an electric field can be reduced, thereby further improving use safety of the transformer.

In this application, the voltage uniform layer is disposed between the high-voltage coil and the insulation member, to balance electric potentials on a surface of the high-voltage coil by using the voltage uniform layer, so that a uniform and stable electric field is generated between the high-voltage coil and the low-voltage coil, to reduce a risk that air between the high-voltage coil and the low-voltage coil is broken down, thereby improving use safety of the transformer.

In one embodiment, a first installation hole is disposed in the low-voltage coil, a second installation hole is disposed in the insulation member, and at least a part of the magnetic core is penetrated through the first installation hole and the second installation hole and penetrated through the high-voltage coil.

In this application, at least the part of the magnetic core is penetrated through the first installation hole and the second installation hole, so that installation of the magnetic core can be facilitated, to simplify an installation structure of the magnetic core, thereby reducing production costs of the transformer.

In one embodiment, the high-voltage coil includes one coil body or a plurality of coil bodies connected to each other in series; and there is one low-voltage coil or a plurality of low-voltage coils, where the plurality of low-voltage coils are connected in series.

In this application, one coil body and one low-voltage coil are disposed, so that an internal structure of the transformer can be simplified, to reduce a size of the transformer and expand an applicable scope of the transformer. A plurality of coil bodies are connected in series, and a plurality of low-voltage coils are connected in series, so that a quantity of output ends of the transformer can be increased, thereby improving working performance of the transformer and expanding an applicable scope of the transformer.

In one embodiment, the high-voltage coil includes one coil body or a plurality of coil bodies connected to each other in parallel; and there is one low-voltage coil or a plurality of low-voltage coils, where the plurality of low-voltage coils are connected in parallel.

In this embodiment, a plurality of coil bodies are connected in parallel, and a plurality of low-voltage coils are connected in parallel, so that diversity of an output voltage of the transformer can be improved, thereby improving working performance of the transformer and expanding an applicable scope of the transformer.

A second aspect of this application provides power equipment. The power equipment includes a transformer, and the transformer is the transformer in any one of the foregoing possible designs.

In this application, the transformer is disposed in the power equipment, to adjust an input voltage and/or an output voltage of the power equipment by using the transformer, thereby improving use performance of the power equipment and expanding an applicable scope of the power equipment.

It should be understood that the foregoing general descriptions and the following detailed descriptions are merely used as examples, and cannot limit this application.

REFERENCE SIGNS

Figure 1:
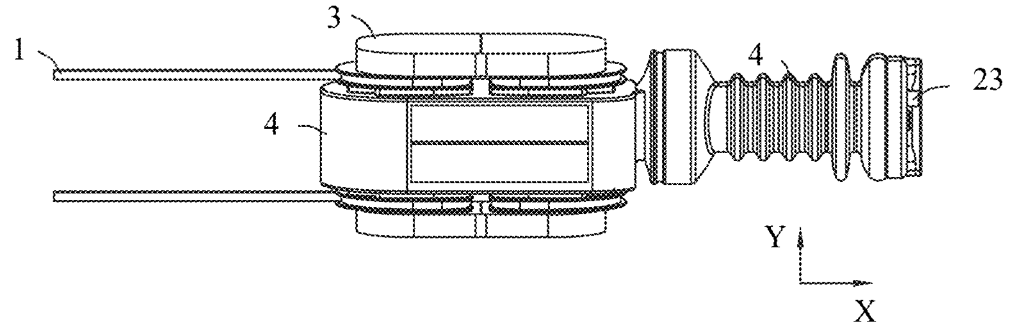
FIG. 1 is a schematic diagram of a structure of a transformer according to one embodiment of this application.

1—Low-voltage coil;
11—First installation hole;
2—High-voltage coil;
21—Coil body;
22—Cable outlet portion;
23—Connection terminal;
24—Voltage uniform layer;
3—Magnetic core;
4—Insulation member;
41—Body portion;
42—Extension portion;
43—First end;
44—Transition portion;
45—Second installation hole;
5—Ground plane.

The accompanying drawings herein are incorporated into this specification and constitute a part of this specification, show embodiments conforming to this application, and are used, together with this specification, to explain the principle of this application.

DESCRIPTION OF EMBODIMENTS

To better understand the technical solutions of this application, the following describes embodiments of this application in detail with reference to the accompanying drawings.

In a specific embodiment, the following further describes this application in detail by using specific embodiments and with reference to the accompanying drawings.

A first aspect of this application provides a transformer. As shown in FIG. 1 to FIG. 4, the transformer includes a low-voltage coil 1; a high-voltage coil 2; a magnetic core 3, where at least a part of the magnetic core 3 is penetrated through the low-voltage coil 1 and the high-voltage coil 2; and an insulation member 4, where the insulation member 4 is wrapped around the high-voltage coil 2 to insulate the high-voltage coil 2 from the low-voltage coil 1 and the magnetic core 3, and a ground plane 5 is disposed on at least a part of an outer surface of the insulation member 4. A voltage uniform layer 24 is disposed between the high-voltage coil 2 and the insulation member 4, the voltage uniform layer 24 is wrapped around the high-voltage coil 2, and the voltage uniform layer 24 is electrically connected to one end of the high-voltage coil 2.

In this embodiment, when the transformer works, conversion between a high voltage and a low voltage is implemented by using the high-voltage coil 2, the low-voltage coil 1, and the magnetic core 3, to meet a use requirement of a user for a voltage. The insulation member 4 is disposed, so that a risk that the air is broken down and insulation between the high-voltage coil 2 and the low-voltage coil 1 fails because an electric field between the high-voltage coil 2 and the low-voltage coil 1 is so strong and exceeds an air tolerance upper limit can be reduced, thereby improving use safety of the transformer. In this embodiment, the insulation member 4 is wrapped around only the high-voltage coil 2. Therefore, compared with wrapping the insulation member 4 around the high-voltage coil 2 and the low-voltage coil 1 in the conventional technology, heat dissipation of the low-voltage coil 1 and the magnetic core 3 can be facilitated while the high-voltage coil 2 is insulated from the low-voltage coil 1 and the magnetic core 3, to reduce a risk that the low-voltage coil 1 and the magnetic core 3 are damaged due to poor heat dissipation of the low-voltage coil 1 and the magnetic core 3, thereby prolonging service lives of the low-voltage coil 1 and the magnetic core 3 and further prolonging a service life of the transformer. In addition, because the insulation member 4 is wrapped around only the high-voltage coil 2, installation and maintenance of the low-voltage coil 1 and the magnetic core 3 can be facilitated, thereby reducing maintenance costs of the transformer; and materials required when the insulation member 4 is processed can be reduced, thereby reducing production costs of the insulation member 4 and further reducing production costs of the transformer.

The ground plane 5 is disposed on at least the part of the outer surface of the insulation member 4. When the transformer starts to work, the ground plane 5 is connected to a ground cable. In this case, an electric potential of the part that is of the outer surface of the insulation member 4, on which the ground plane is disposed, and that is in contact with the air is 0. Therefore, a voltage difference between the part that is of the outer surface of the insulation member 4 and on which the ground plane is disposed and the low-voltage coil 1, a voltage difference between the part that is of the outer surface of the insulation member 4 and on which the ground plane is disposed and the magnetic core 3, and electric field strength in the air are reduced. Finally, a risk that air between the high-voltage coil 2 and the low-voltage coil 1 and air between the high-voltage coil 2 and the magnetic core 3 are broken down is reduced, thereby further improving use safety of the transformer.

Figure 4:
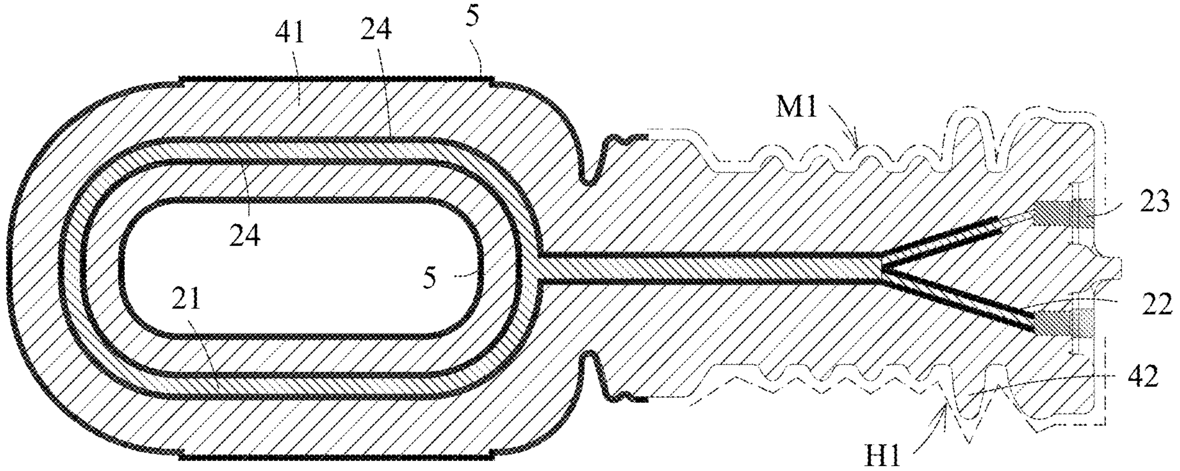
FIG. 4 is a cross-sectional view obtained after an insulation member and a high-voltage coil in FIG. 2 are assembled according to one embodiment of this application.
Figure 5:
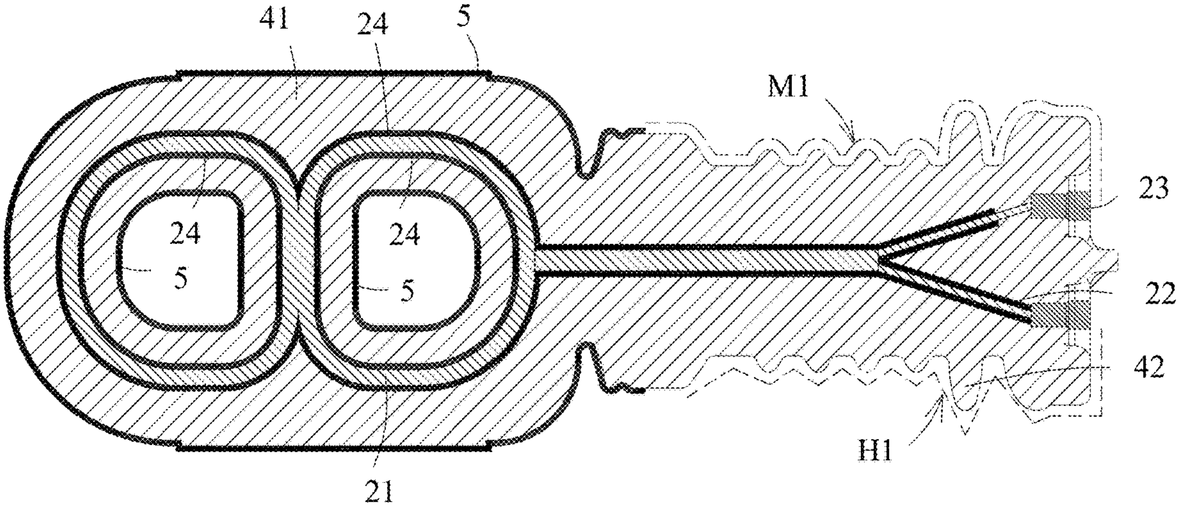
FIG. 5 is a cross-sectional view obtained after an insulation member and a high-voltage coil in FIG. 2 are assembled according to one embodiment of this application.

Because an outer surface of the high-voltage coil 2 is uneven, electric field strength generated when the high-voltage coil 2 works is uneven, increasing a risk that an air clearance on a contact surface between the high-voltage coil 2 and the insulation member 4 is broken down and a risk that an air clearance inside the insulation member 4 is broken down. Therefore, the voltage uniform layer 24 is disposed between the high-voltage coil 2 and the insulation member 4, and the voltage uniform layer 24 is electrically connected to one end of the high-voltage coil 2, to balance electric potentials on the surface of the high-voltage coil 2 by using the voltage uniform layer 24, so that a uniform and stable electric field is generated between the high-voltage coil 2, the ground plane 5 on the surface of the insulation member, the low-voltage coil 1, and the magnetic core 3, to reduce the risk that the air clearance on the contact surface between the high-voltage coil 2 and the insulation member 4 is broken down and a risk that an insulation material and air inside the insulation member 4 are broken down, thereby improving use safety of the transformer. In addition, a structure of the insulation member 4 wrapped around the high-voltage coil 2 is simplified, thereby reducing production costs of the insulation member 4. As shown in FIG. 4 and FIG. 5, the voltage uniform layer 24 is connected to one end of the high-voltage coil 2, and the voltage uniform layer 24 is disconnected from the other end of the high-voltage coil 2, so that a risk that the high-voltage coil 2 is short-circuited by the voltage uniform layer 24 because the voltage uniform layer 24 is connected to both the two ends of the high-voltage coil 2 can be reduced, thereby improving working stability and use safety of the transformer. A material of the voltage uniform layer 24 may be a conducting layer or a semi-conducting layer.

The transformer provided in this embodiment may be applied to a scenario including an isolation transformer, such as a series resonance topology or a phase-shift full-bridge topology. An application scenario of the transformer is not specially limited in this embodiment of this application.

For example, the insulation member 4 is wrapped around the high-voltage coil 2 through casting.

In this embodiment, the insulation member 4 is wrapped around the high-voltage coil 2 through casting, so that a connection manner between the insulation member 4 and the high-voltage coil 2 can be simplified, to simplify structures of the high-voltage coil 2 and the insulation member 4, and reduce a quantity of parts required when the high-voltage coil 2 is connected to the insulation member 4, thereby reducing production costs of the high-voltage coil 2 and the insulation member 4. In addition, the insulation member 4 is wrapped around the high-voltage coil 2 through casting, so that connection stability between the high-voltage coil 2 and the insulation member 4 can be improved, to reduce a risk that the high-voltage coil 2 moves relative to the insulator, thereby improving working stability and use safety of the transformer.

The insulation member 4 may be generated through casting or die casting, to reduce a risk that an air cavity exists inside the insulation member 4, thereby improving quality of the insulation member 4. The insulation member 4 may be epoxy resin, insulation rubber, or the like. A material of the insulation member 4 is not specially limited in this embodiment of this application.

Figure 3:
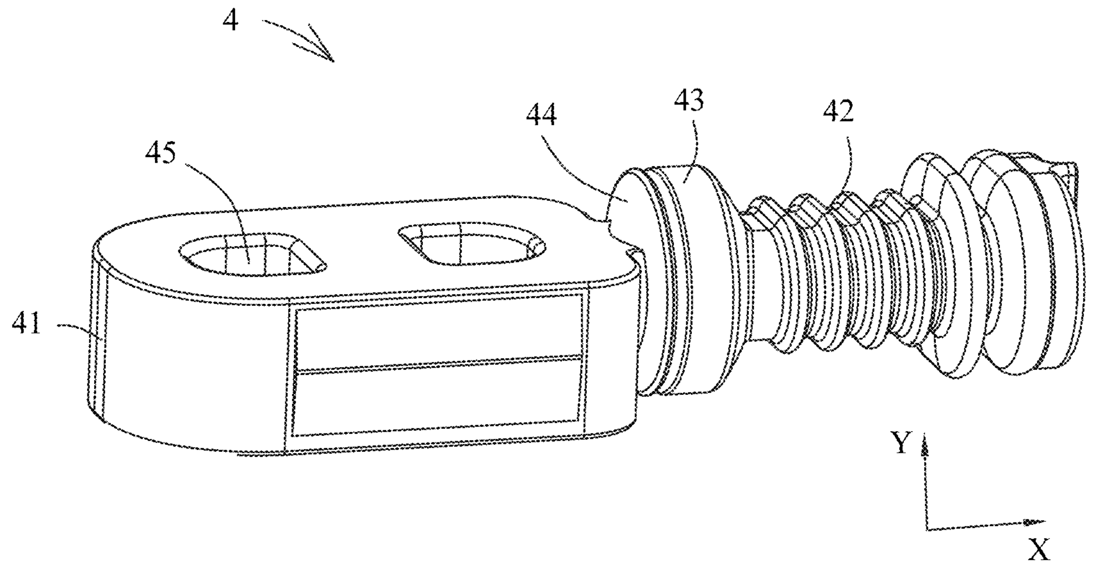
FIG. 3 is a schematic diagram of a structure of an insulation member in FIG. 2 according to one embodiment of this application.

For example, as shown in FIG. 3, the high-voltage coil 2 includes a coil body 21, a cable outlet portion 22, and a connection terminal 23. One end of the cable outlet portion 22 is connected to the coil body 21, and the other end is connected to the connection terminal 23. The insulation member 4 is wrapped around the coil body 21, the cable outlet portion 22, and a part of the connection terminal 23, and at least a part of the connection terminal 23 is exposed.

In this embodiment, the connection terminal 23 is connected to a high-voltage power supply or a high-voltage electric potential to form a high-voltage end, and the ground plane 5 of the insulation member 4 is connected to the ground cable to form a low-voltage end. In a use process of the transformer, a current passes through the high-voltage coil 2, the cable outlet portion 22, and the connection terminal 23. As shown in FIG. 4 and FIG. 5, along the outer surface of the insulation member 4, a creepage distance M1 exists between an end that is of the ground plane 5 and that is close to the connection terminal 23 and the connection terminal 23, and an electrical clearance H1 exists between the end that is of the ground plane 5 and that is close to the connection terminal 23 and the connection terminal 23. If the creepage distance M1 is too small and the electrical clearance H1 is too small, there is a risk that external air or an insulation material between the high-voltage end and the low-voltage end is prone to be broken down, and consequently a safety problem is caused. The insulation member 4 is wrapped around the coil body 21 and the cable outlet portion 22 and wrapped around the part of the connection terminal 23, so that the creepage distance M1 and the electrical clearance H1 can be increased, to reduce a risk that the external air or the insulation material between the high-voltage end and the low-voltage end is broken down because the creepage distance M1 and the electrical clearance H1 are too small, thereby further improving use safety of the transformer.

For example, as shown in FIG. 1 to FIG. 4, a creepage distance M2 exists between an end that is of the low-voltage coil 1 and that is close to the connection terminal 23 and the connection terminal 23, an electrical clearance H2 exists between the end that is of the low-voltage coil 1 and that is close to the connection terminal 23 and the connection terminal 23, M2>M1, and H2>H1. A creepage distance M3 exists between an end that is of the magnetic core 3 and that is close to the connection terminal 23 and the connection terminal 23, an electrical clearance H3 exists between the end that is of the magnetic core 3 and that is close to the connection terminal 23 and the connection terminal 23, M3>M1, and H3>H1.

In this embodiment, a shortest path that is between the low-voltage coil 1 and the connection terminal 23 and that is measured along the surface of the insulation member 4 is the creepage distance M2, and a shortest path that is between the magnetic core 3 and the connection terminal 23 and that is measured along the surface of the insulation member 4 is the creepage distance M3. A shortest path that is between the ground plane 5 and the connection terminal 23 and that is measured along the air is the electrical clearance H1, a shortest path that is between the low-voltage coil 1 and the connection terminal 23 and that is measured along the air is the electrical clearance H2, and a shortest path that is between the magnetic core 3 and the connection terminal 23 and that is measured along the air is the electrical clearance H3.

In this embodiment, in a length direction X of the high-voltage coil 2, if a distance between the end that is of the ground plane 5 and that is close to the connection terminal 23 and the connection terminal 23 is less than a distance between the end that is of the low-voltage coil 1 and that is close to the connection terminal 23 and the connection terminal 23, and a distance between the end that is of the ground plane 5 and that is close to the connection terminal 23 and the connection terminal 23 is less than a distance between the end that is of the magnetic core 3 and that is close to the connection terminal 23 and the connection terminal 23, electric fields generated by excess parts of the low-voltage coil 1 and the magnetic core 3 relative to the ground plane 5 directly enter the air, and consequently there is a risk that the air is prone to be broken down by a strong electric field. Therefore, M2>M1, and M3>M1, that is, in the length direction X of the high-voltage coil 2, the distance between the end that is of the low-voltage coil 1 and that is close to the connection terminal 23 and the connection terminal 23 is less than the distance between the end that is of the ground plane 5 and that is close to the connection terminal 23 and the connection terminal 23, and the distance between the end that is of the magnetic core 3 and that is close to the connection terminal 23 and the connection terminal 23 is less than the distance between the end that is of the ground plane 5 and that is close to the connection terminal 23 and the connection terminal 23, so that a length of the ground plane 5 is greater than a length of the low-voltage coil 1 and a length of the magnetic core 3. Therefore, a risk that the air is broken down can be reduced, thereby improving use safety of the transformer and prolonging a service life of the transformer. H2>H1, and H3>H1, that is, in a thickness direction Y of the high-voltage coil 2, a distance between the low-voltage coil 1 and the connection terminal 23 is less than a distance between the ground plane 5 and the connection terminal 23, and a distance between the magnetic core 3 and the connection terminal 23 is less than the distance between the ground plane 5 and the connection terminal 23, so that installation of the high-voltage coil 2, the low-voltage coil 1, and the magnetic core 3 can be facilitated, to simplify a structure of the transformer, thereby reducing production costs of the transformer.

For example, as shown in FIG. 3 and FIG. 4, the insulation member 4 includes a body portion 41 and an extension portion 42. The body portion 41 is wrapped around the coil body 21, and the extension portion 42 is wrapped around the cable outlet portion 22 and the part of the connection terminal 23. The extension portion 42 has a first end 43 connected to the body portion 41, and a thickness of the first end 43 is greater than a thickness of the body portion 41.

In this embodiment, because of an electric field end effect, electric field strength at an end of the high-voltage coil 2 and an end of the low-voltage coil 1 is the highest. Therefore, the thickness of the first end 43 of the insulation member 4 is greater than the thickness of the body portion 41, so that a risk that air outside the first end 43 is broken down by an electric field can be reduced, thereby improving use safety of the transformer. Electric field strength of a place away from the end of the high-voltage coil 2 and the end of the low-voltage coil 1 gradually decreases. Therefore, a thickness of an end that is of the extension portion 42 and that is away from the body portion 41 may be less than the thickness of the first end 43, to reduce materials of the insulation member 4, thereby reducing costs.

In addition, to improve use safety of the transformer, the creepage distance M1 and the electrical clearance H1 between the end that is of the ground plane 5 and that is close to the connection terminal 23 and the connection terminal 23 need to meet safety distance requirements specified in a standard. Therefore, the extension portion 42 is relatively long or at least a part of the extension portion 42 is a wavy structure, so that an area of an outer surface of the extension portion 42 can be increased, to increase the creepage distance M1 and the electrical clearance H1 between the end that is of the ground plane 5 and that is close to the connection terminal 23 and the connection terminal 23. In this embodiment, at least the part of the extension portion 42 is the wavy structure, so that a size of the insulation member 4 can be reduced while it is ensured that the creepage distance M1 meets a safe distance requirement specified in the standard, and a size of the transformer can be reduced while production costs of the insulation member 4 are reduced, thereby reducing production costs of the transformer and expanding an applicable scope of the transformer. In addition, at least the part of the extension portion 42 is the wavy structure, so that a contact area between the insulation member 4 and the air is increased, thereby improving heat dissipation efficiency of the high-voltage coil 2 and working stability of the high-voltage coil 2.

For example, as shown in FIG. 3, the body portion 41 is connected to the extension portion 42 by using a transition portion 44. The transition portion 44 is arc-shaped, and a cross-sectional area of the transition portion 44 increases in a direction from the body portion 41 to the extension portion 42. The ground plane 5 is wrapped around the transition portion 44.

In this embodiment, because there is a non-uniform tip electric field line between ends of the high-voltage coil 2, the low-voltage coil 1, and the ground plane 5, the ends are designed to be arc-shaped, so that impact of a tip electric field can be well buffered. Therefore, the body portion 41 is connected to the extension portion 42 by using the arc-shaped transition portion 44, so that electric field strength of the insulation material of the insulation member 4 can be effectively reduced while a risk that the air is broken down by an end electric field is reduced, thereby improving insulation reliability and increasing a service life of the material. In addition, a size of the insulation member 4 can be reduced, to reduce production costs of the insulation member 4 and space that is of the transformer and that is occupied by the insulation member 4, thereby reducing a size of the transformer and expanding an applicable scope of the transformer. The ground plane 5 is wrapped around an outer surface of the transition portion 44, so that a risk that air outside the transition portion 44 is broken down by an electric field can be reduced, thereby further improving use safety of the transformer.

Figure 2:
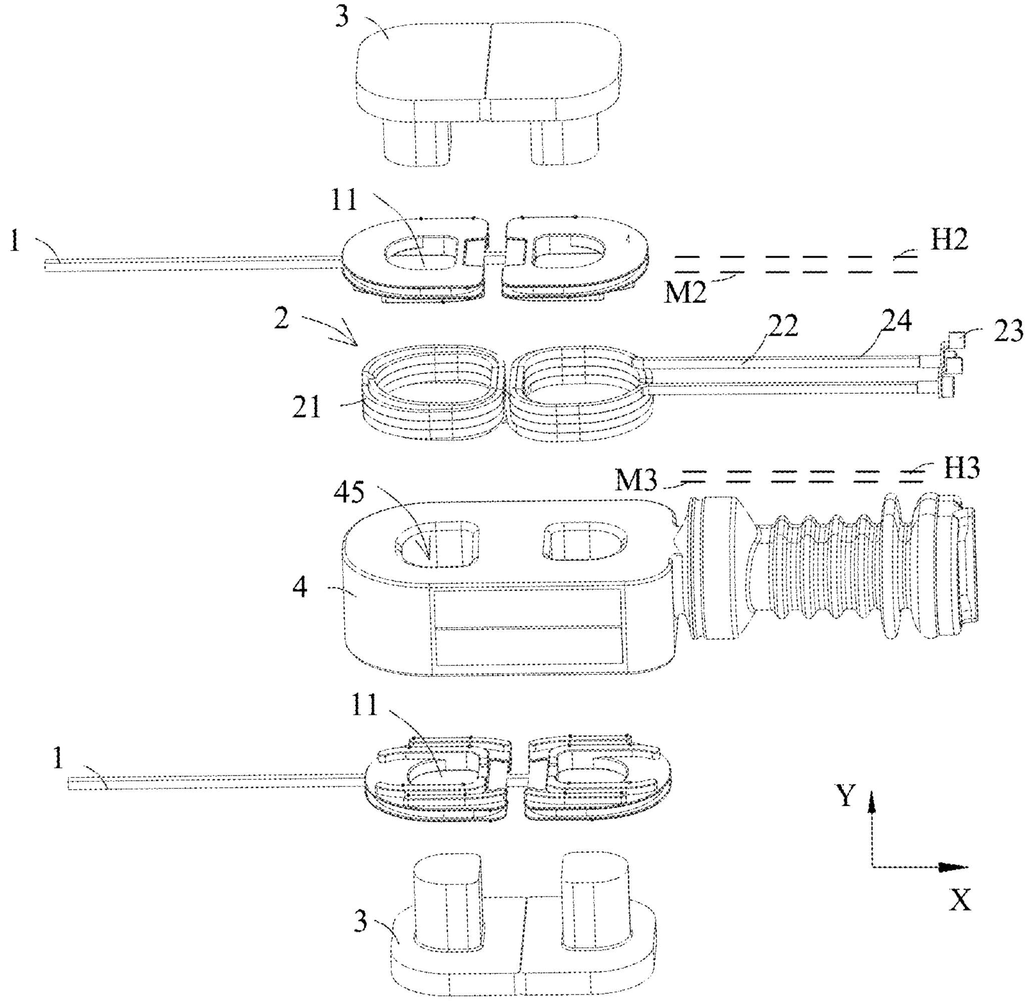
FIG. 2 is an exploded view of FIG. 1 according to one embodiment of this application.

In any one of the foregoing embodiments, as shown in FIG. 2 and FIG. 3, a first installation hole 11 is disposed in the low-voltage coil 1, a second installation hole 45 is disposed in the insulation member 4, and at least the part of the magnetic core 3 is penetrated through the first installation hole 11 and the second installation hole 45 and penetrated through the high-voltage coil 2.

In this embodiment, at least the part of the magnetic core 3 is penetrated through the first installation hole 11 and the second installation hole 45 and penetrated through the high-voltage coil 2, so that the magnetic core 3 can be penetrated through both the low-voltage coil 1 and the high-voltage coil 2, to reduce a risk that the transformer cannot normally work because the magnetic core 3 is not penetrated through the low-voltage coil 1 and/or the high-voltage coil 2, thereby improving working stability and reliability of the transformer. In addition, at least the part of the magnetic core 3 is penetrated through the first installation hole 11 and the second installation hole 45, so that installation of the magnetic core 3 can be facilitated, to simplify an installation structure of the magnetic core 3 and reduce a quantity of parts required when the magnetic core 3 is installed, thereby reducing a size of the transformer and production costs of the transformer and also expanding an applicable scope of the transformer.

In an embodiment, as shown in FIG. 4 and FIG. 5, the high-voltage coil 2 includes one coil body 21 or a plurality of coil bodies 21 connected to each other in series; and there is one low-voltage coil 1 or a plurality of low-voltage coils 1, where the plurality of low-voltage coils 1 are connected in series.

In this embodiment, as shown in FIG. 4, the high-voltage coil 2 includes one coil body 21, so that a structure of the high-voltage coil 2 can be simplified, to reduce internal space that is of the transformer and that is occupied by the high-voltage coil 2, thereby reducing a size of the transformer and expanding an applicable scope of the transformer. As shown in FIG. 5, a plurality of coil bodies 21 are connected in series, and a plurality of low-voltage coils 1 are connected in series, so that a quantity of output ends of the transformer can be increased, thereby improving working performance of the transformer and expanding an applicable scope of the transformer. If adjacent magnetic cores 3 are insulated from each other, to ensure that a plurality of coil bodies 21 are connected in series and a plurality of low-voltage coils 1 are connected in series, winding manners of the coil body 21 and the low-voltage coil 1 are relatively complex. Therefore, a plurality of magnetic cores 3 are disposed, and adjacent magnetic cores 3 are connected, so that winding manners of the high-voltage coil 2 and the low-voltage coil 1 can be simplified, to facilitate installation, detachment, and maintenance of the high-voltage coil 2 and the low-voltage coil 1, thereby reducing maintenance costs of the transformer.

The plurality of magnetic cores 3 may be integrally formed, or may be connected through fastening, to facilitate connection between adjacent magnetic cores 3.

In addition, the plurality of coil bodies 21 connected in series may be formed through winding by using one high-voltage coil 2, or may be formed by using a plurality of high-voltage coils 2. In this application, the coil bodies 21 are formed through winding by using one high-voltage coil 2, so that a connection manner between adjacent coil bodies 21 can be simplified.

In another embodiment, as shown in FIG. 4 and FIG. 5, the high-voltage coil 2 includes one coil body 21 or a plurality of coil bodies 21 connected to each other in parallel; and there is one low-voltage coil 1 or a plurality of low-voltage coils 1, where the plurality of low-voltage coils 1 are connected in parallel.

In this embodiment, a plurality of coil bodies 21 are connected in parallel, and a plurality of low-voltage coils 1 are connected in parallel, so that diversity of an output voltage of the transformer can be improved, thereby improving working performance of the transformer and expanding an applicable scope of the transformer. A plurality of magnetic cores 3 are disposed, and adjacent magnetic cores 3 are insulated from each other, so that impact between adjacent coil bodies 21 and impact between adjacent low-voltage coils 1 can be reduced, to improve working stability of the high-voltage coil 2 and the low-voltage coil 1, thereby improving working stability of the transformer.

A second aspect of the embodiments provides power equipment. The power equipment includes a transformer, and the transformer is the transformer in any one of the foregoing embodiments.

In this embodiment, the transformer is disposed in the power equipment, to adjust an input voltage and/or an output voltage of the power equipment by using the transformer, thereby improving use performance of the power equipment and expanding an applicable scope of the power equipment. The power equipment may be a medium-voltage frequency converter, a power electronic transformer, a direct current micro grid, or the like. A specific type of the power equipment is not specially limited in this embodiment of this application.

It should be noted that a part of this patent application document includes content protected by copyright. The copyright owner retains the copyright except for making a copy of content of a patent document of the China National Intellectual Property Administration or a recorded patent file.

What is claimed is:

1. A transformer, comprising:

a low-voltage coil;

a high-voltage coil;

a magnetic core, wherein at least a part of the magnetic core is penetrated through the low-voltage coil and the high-voltage coil; and an insulation member wrapped around the high-voltage coil, to insulate the high-voltage coil from the low-voltage coil and the magnetic core, wherein a ground plane is disposed on at least a part of an outer surface of the insulation member; and a voltage uniform layer is disposed between the high-voltage coil and the insulation member, the voltage uniform layer being wrapped around the high-voltage coil and electrically connected to one end of the high-voltage coil, wherein the high-voltage coil comprises a coil body, a cable outlet portion, and a connection terminal, and wherein the insulation member comprises a body portion and an extension portion, wherein the body portion is wrapped around the coil body, wherein the extension portion is wrapped around the cable outlet portion and the part of the connection terminal;

wherein the extension portion has a first end connected to the body portion, and a thickness of the first end is greater than a thickness of the body portion, and wherein the body portion is connected to the extension portion by using a transition portion, the transition portion being arc-shaped, wherein a cross-sectional area of the transition portion increases in a direction from the body portion to the extension portion.

2. The transformer according to claim 1, wherein the insulation member is wrapped around the high-voltage coil through casting.

3. The transformer according to claim 1, wherein a first end of the cable outlet portion is connected to the coil body, and a second end is connected to the connection terminal; and wherein the insulation member is wrapped around the coil body, the cable outlet portion, and a part of the connection terminal, and wherein at least a part of the connection terminal is exposed.

4. The transformer according to claim 3, wherein a creepage distance M1 exists between an end of the ground plane close to the connection terminal and the connection terminal, and wherein an electrical clearance H1 exists between the end of the ground plane close to the connection terminal and the connection terminal;

wherein a creepage distance M2 exists between an end of the low-voltage coil close to the connection terminal and the connection terminal, wherein an electrical clearance H2 exists between the end of the low-voltage coil close to the connection terminal and the connection terminal, wherein M2>M1, and H2>H1; and wherein a creepage distance M3 exists between an end of the magnetic core close to the connection terminal and the connection terminal, wherein an electrical clearance H3 exists between the end of the magnetic core close to the connection terminal and the connection terminal, wherein M3>M1, and H3>H1.

5. The transformer according to claim 1, wherein the ground plane is wrapped around the transition portion.

6. The transformer according to claim 1, wherein a first installation hole is disposed in the low-voltage coil, wherein a second installation hole is disposed in the insulation member, and wherein at least a part of the magnetic core is penetrated through the first installation hole and the second installation hole and penetrated through the high-voltage coil.

7. The transformer according to claim 1, wherein the high-voltage coil comprises one coil body or a plurality of coil bodies connected to each other in series; and there is one low-voltage coil or a plurality of low-voltage coils connected in series.

8. The transformer according to claim 1, wherein the high-voltage coil comprises one coil body or a plurality of coil bodies connected to each other in parallel; and there is one low-voltage coil or a plurality of low-voltage coils, connected in parallel.

9. The transformer according to claim 1, wherein the insulation member is wrapped around the high-voltage coil through casting, wherein a first installation hole is disposed in the low-voltage coil, wherein a second installation hole is disposed in the insulation member, and wherein at least a part of the magnetic core is penetrated through the first installation hole and the second installation hole and penetrated through the high-voltage coil.

10. The transformer according to claim 1, wherein the insulation member is wrapped around the high-voltage coil through casting, wherein the high-voltage coil comprises one coil body or a plurality of coil bodies connected to each other in series; and there is one low-voltage coil or a plurality of low-voltage coils connected in series.

11. The transformer according to claim 2, wherein the insulation member is wrapped around the high-voltage coil through casting, wherein the high-voltage coil comprises one coil body or a plurality of coil bodies connected to each other in parallel; and there is one low-voltage coil or a plurality of low-voltage coils connected in parallel.

12. A power equipment, comprising a transformer, the transformer comprising:

a low-voltage coil;

a high-voltage coil;

a magnetic core, wherein at least a part of the magnetic core is penetrated through the low-voltage coil and the high-voltage coil; and an insulation member wrapped around the high-voltage coil, to insulate the high-voltage coil from the low-voltage coil and the magnetic core, and wherein a ground plane is disposed on at least a part of an outer surface of the insulation member; and a voltage uniform layer disposed between the high-voltage coil and the insulation member, the voltage uniform layer being wrapped around the high-voltage coil and electrically connected to one end of the high-voltage coil, wherein the high-voltage coil comprises a coil body, a cable outlet portion, and a connection terminal, and wherein the insulation member comprises a body portion and an extension portion, wherein the body portion is wrapped around the coil body, wherein the extension portion is wrapped around the cable outlet portion and the part of the connection terminal;

wherein the extension portion has a first end connected to the body portion, and a thickness of the first end is greater than a thickness of the body portion, and wherein the body portion is connected to the extension portion by using a transition portion, the transition portion being arc-shaped, wherein a cross-sectional area of the transition portion increases in a direction from the body portion to the extension portion.

13. The power equipment according to claim 12, wherein the insulation member is wrapped around the high-voltage coil through casting.

14. The power equipment according to claim 12, wherein a first end of the cable outlet portion is connected to the coil body, and a second end is connected to the connection terminal; and wherein the insulation member is wrapped around the coil body, the cable outlet portion, and a part of the connection terminal, and wherein at least a part of the connection terminal is exposed.

15. The power equipment according to claim 14, wherein a creepage distance M1 exists between an end of the ground plane close to the connection terminal and the connection terminal, and wherein an electrical clearance H1 exists between the end of the ground plane close to the connection terminal and the connection terminal;

wherein a creepage distance M2 exists between an end of the low-voltage coil close to the connection terminal and the connection terminal, wherein an electrical clearance H2 exists between the end of the low-voltage coil close to the connection terminal and the connection terminal, wherein M2>M1, and H2>H1; and wherein a creepage distance M3 exists between an end of the magnetic core close to the connection terminal and the connection terminal, wherein an electrical clearance H3 exists between the end of the magnetic core close to the connection terminal and the connection terminal, wherein M3>M1, and H3>H1.

16. The power equipment according to claim 12, wherein the ground plane is wrapped around the transition portion.

17. The power equipment according to claim 12, wherein a first installation hole is disposed in the low-voltage coil, wherein a second installation hole is disposed in the insulation member, and wherein at least a part of the magnetic core is penetrated through the first installation hole and the second installation hole and penetrated through the high-voltage coil.

18. The power equipment according to claim 12, wherein the high-voltage coil comprises one coil body or a plurality of coil bodies connected to each other in series; and there is one low-voltage coil or a plurality of low-voltage coils connected in series.

19. The power equipment according to claim 12, wherein the high-voltage coil comprises one coil body or a plurality of coil bodies connected to each other in parallel; and there is one low-voltage coil or a plurality of low-voltage coils connected in parallel.

* * * * *